United States Patent [19]

Shah

[11] Patent Number: 5,354,523
[45] Date of Patent: Oct. 11, 1994

[54] METHOD FOR DUAL FLUID INJECTION MOLDING

[76] Inventor: Chandrakant C. Shah, 4433 Clarke, Troy, Mich. 48098

[21] Appl. No.: 922,683

[22] Filed: Jul. 29, 1992

[51] Int. Cl.⁵ .................. B29C 35/16; B29C 45/72; B29C 45/78
[52] U.S. Cl. ........................ 264/28; 264/37; 264/85; 264/572
[58] Field of Search .......... 264/37, 85, 28, 572, 264/45.1, 53, 570, 528

[56] References Cited

U.S. PATENT DOCUMENTS

| | | | |
|---|---|---|---|
| 2,175,053 | 10/1939 | Ferngren | 264/539 |
| 3,065,501 | 11/1962 | Gasmire | 264/528 |
| 3,520,020 | 7/1970 | Williams et al. | 264/528 |
| 3,760,599 | 9/1973 | Bose | 264/28 |
| 3,888,961 | 6/1975 | Schonewald | 264/528 |
| 4,115,491 | 9/1978 | Hanning | 264/45.1 |
| 4,140,672 | 2/1979 | Kataoka | 264/45.1 |
| 4,247,515 | 1/1981 | Olabisi | 264/45.1 |
| 4,435,523 | 3/1984 | Ponzielli | 264/528 |
| 4,781,554 | 11/1988 | Hendry | 264/45.1 |
| 5,030,076 | 7/1991 | Ebenhofer et al. | 264/241 |
| 5,080,570 | 1/1992 | Baxi et al. | 264/572 |
| 5,093,053 | 3/1992 | Eckardt et al. | 264/570 |
| 5,096,655 | 3/1992 | Baxi et al. | 264/572 |
| 5,141,682 | 8/1992 | Steinbichler et al. | 264/572 |

FOREIGN PATENT DOCUMENTS

| | | | |
|---|---|---|---|
| 56-157322 | 12/1981 | Japan | 264/528 |
| 57-14968 | 3/1982 | Japan | 264/572 |

*Primary Examiner*—Catherine Timm
*Attorney, Agent, or Firm*—James H. Bower

[57] ABSTRACT

A process for injection molding of thermoplastic materials which includes a nozzle body having a bore to provide a flow path for molten thermoplastic. One end of the nozzle body is adapted for connection with a sprue of an associated mold body, and the other is adapted for connection with an end of an associated injection molding machine. The nozzle body has a shut-off valve fluid pin housing adapted for reciprocating movement in the nozzle bore to control the flow of plastic through the nozzle body. The shut-off valve fluid pin housing also includes a body having an adjustable fluid pin with a tip portion and a fluid passage formed in the body and open at the tip portion and the other end of the fluid passage communicating with a source of two pressurized fluids, one in vapor and liquid phase and another in gas. The shut-off valve is actuated to allow thermoplastic material to flow and subsequently a first pressurized fluid vapor is allowed to flow to form a hollow cavity in the thermoplastic material and then terminated and a second fluid which is a gas is allowed to flow into the cavity followed by the liquid of the first fluid. The fluid flow is controlled by the fluid pin shape and stroke adjustments. After the thermoplastic material has set, the pressurized fluid is vented through the fluid pin housing passage into a fluid condenser for recovery of the vapor and liquid and then into atmosphere.

17 Claims, 2 Drawing Sheets

METHOD FOR DUAL FLUID INJECTION MOLDING

CROSS REFERENCE TO RELATED APPLICATION

This application is related to United States patent application entitled "Apparatus For Injection Molding" U.S. Ser. No. 755 672 filed Sep. 6, 1992 of which Chandrakant S. Shah is co-inventor.

SUMMARY OF THE INVENTION

The present invention relates to a method for injection molding thermoplastic materials. More specifically the invention relates to a nozzle for the injection molding of thermoplastic materials in which two pressurized fluids are introduced into the molten thermoplastic during the process.

In injection molding, it is known that to urge the molten thermoplastic in an injection mold outwardly into contact with the mold surfaces by exerting pressure on the plastic material is an advantage. This pressure aids the external surface of the plastic material in assuming the precise shape dictated by the mold surface. Such pressure may be applied by a first fluid vapor, such as carbon dioxide vapor, then a second fluid air and then a liquid phase of first fluid, carbon dioxide, all of which are injected into the molten plastic in the mold space. The fluid injected part has the further advantage of using less plastic and is lighter than if the part were solid plastic.

Of more importance is that the plastic will not have a tendency to shrink away from the mold walls during cooling since an internal fluid pressure will keep it expanded against the walls.

The above process is often called dual fluid injection molding where the vapor and liquid phase of one fluid and another non viscous gas are used. The first fluid may be carbon dioxide nitrogen, or Freon, and second fluid which is a gas; and must be different from first fluid, may be air, carbon dioxide nitrogen or Freon. The term "Freon" shall include Freon and its equivalent such as R12 (refrigerant 12) R22 or replacement of R12, such as R134a, R152a, R124, R142b or azeotropic mixtures.

After all the fluids are injected, a pressure is maintained on the fluid in the hollow fluid space in the mold cavity called hollow cavity, until the molten plastic has set due to cooling. The mold then is released of the mixture of pressurized fluid in the hollow cavity and the molded part is then taken out of the mold cavity.

The prior art valve assemblies have the disadvantage that the fluid control, as the fluid enters the sprue area and molten plastic stream, is, not adjustable for various conditions and plastics. Also during gas venting from the components, the fluid passage may be used resulting in molten plastic remaining in the nozzle or mold space being vented back along with the fluids. This condition may clog the fluid passage in the nozzle and the fluid lines downstream from the nozzle and the nozzle becomes unusable until it is cleaned out, which is time consuming and expensive.

Also, considerable time is involved in the mold cooling to set the molten plastic.

In view of the foregoing problems, it is considered desirable to develop a new and improved injection molding nozzle and process which would overcome the above while providing better and more advantageous results.

It is a further object to provide a method and apparatus in which a fluid nozzle has an orifice of adjustable area and has a higher coefficient of discharge of a nozzle during fluid injection and a lower coefficient of discharge of an orifice during venting due to its shape, thereby preventing thermoplastic material dragging through the fluid bore during venting.

Another advantage of the process is injecting liquid which evaporates at its partial pressure, which is the pressure exerted by its vapor when it alone occupies the cavity, and its temperature is same as that of the fluid mixture. The fluid liquid evaporation at lower saturation temperature at lower vapor pressure provides cooling after it is injected and provides further cooling by evaporation due to lowering of total pressure, which is the sum of partial pressure of gases in cavity, during venting. This cooling is provided to the fluid hollowed section of the plastic in the mold, runner, and sprue and reduces the over all cycle time of the molding process.

Other advantages of the invention are the ability to exhaust the cavity faster by enlarging the orifice opening after initial venting and re-injecting a small quantity of molten thermoplastic in the hollow core to seal the opening at the sprue or runner, while maintaining the gaseous and liquid fluid bore closed preventing entry of molten plastic into the passage.

A further advantage of the invention is the ability to cool the mold component hollow side without changing pressure or temperature of the injection fluids, as latent heat is taken by the first fluid.

DETAILED DESCRIPTION OF THE PREFERRED EMBODIMENT

Figure 1:
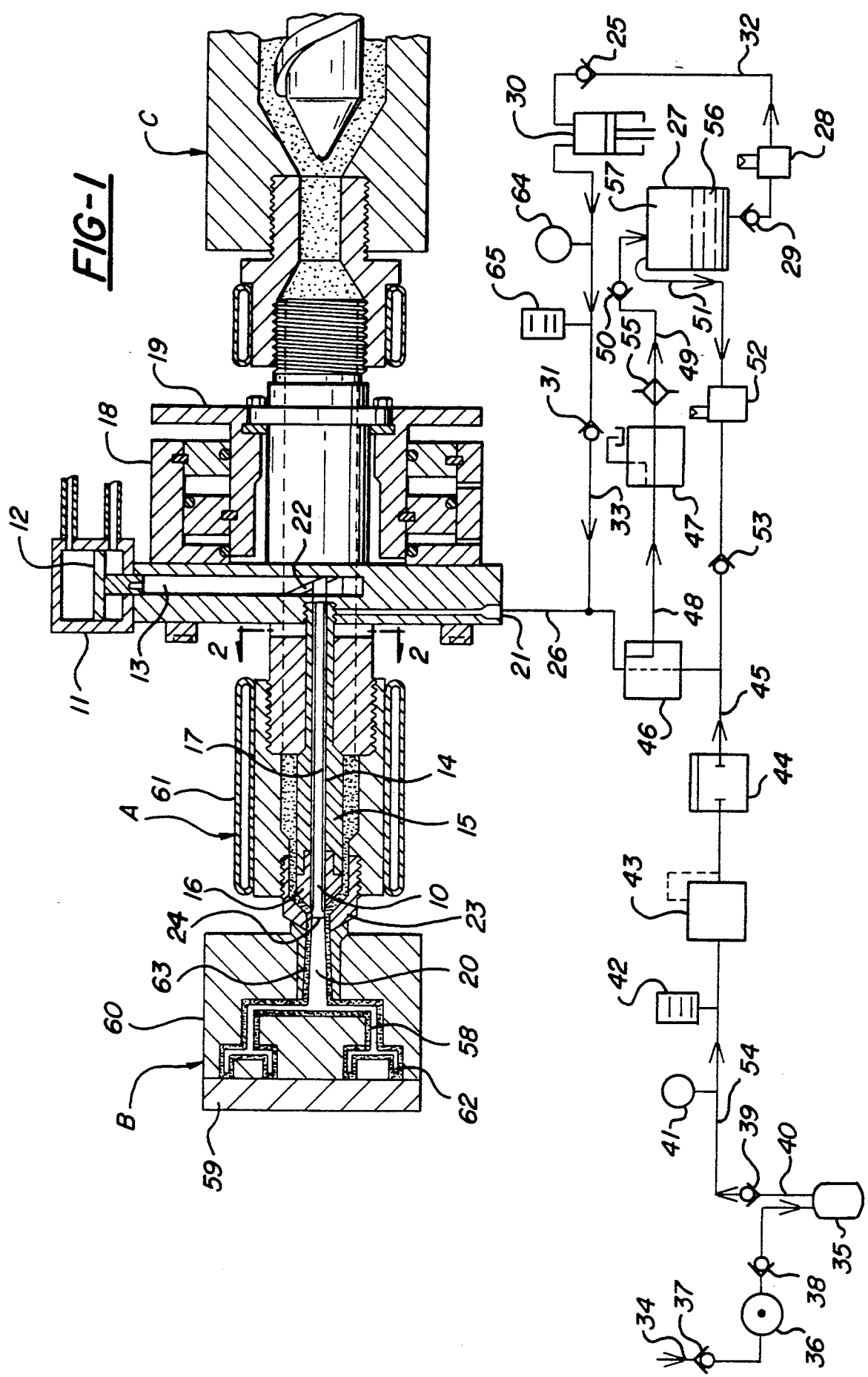
FIG. 1 is a side elevational view in cross section of the nozzle assembly connected between a mold body and a screw ram of an injection molding apparatus with the shut off valve body shown in the open position; also is shown the pressurized dual fluid circuit associated with the nozzle assembly.

Referring to the drawings, FIG. 1 shows the nozzle assembly A connected between a mold body B and a screw ram C of an injection molding device. Also shown in FIG. 1 is the pressurized dual fluid circuit associated with the shut off nozzle valve shown in the open position.

Figure 3:
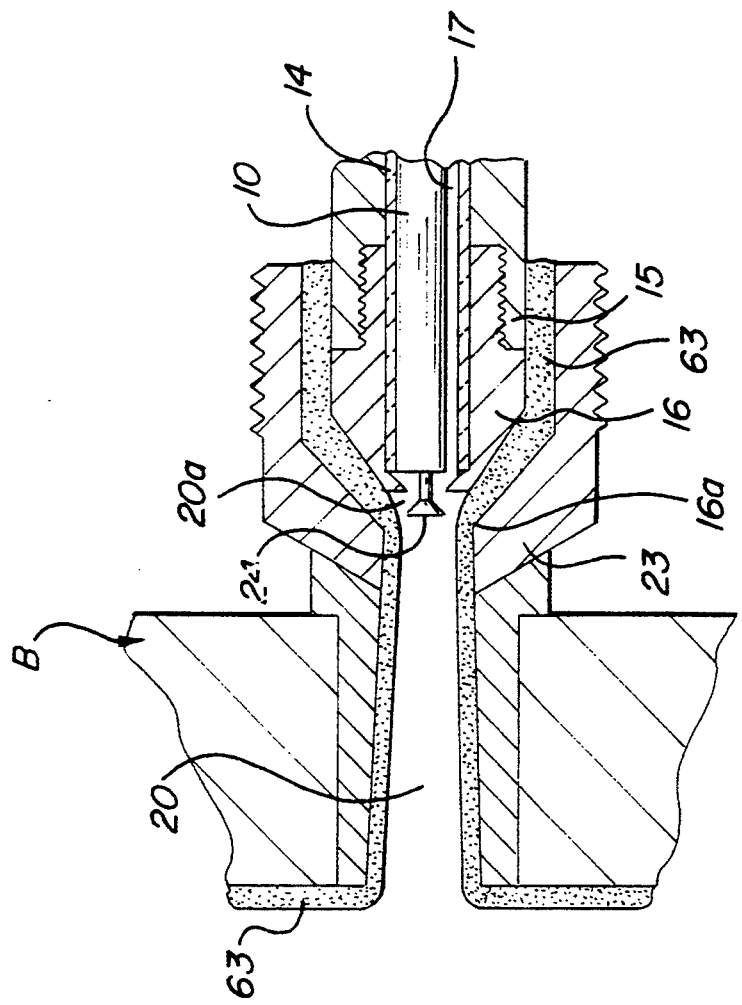
FIG. 3 is an enlarged side elevational view in cross section of the molten thermoplastic shut off nozzle assembly and fluid pin orifice, both shown in the open position.
Figure 2:
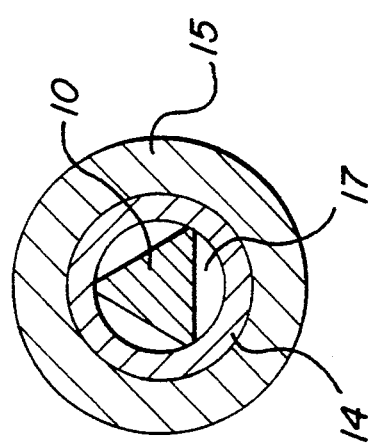
FIG. 2 is an enlarged cross-sectional view through the shut off valve body that incorporates within its bore the adjustable fluid pin and fluid passage.

Nozzle assembly A, shown enlarged in FIG. 3, includes a thermoplastic shut off valve 15 which reciprocates to stop and start plastic flow 63 by making seal contact at 16a, the shut off valve tip 16 seal surface, with nozzle tip 23.

As seen in FIG. 3, the thermoplastic shut off orifice is shaped at seal surface 16 to permit line seal contact at 16a. This is accomplished by reducing the outside taper of pin body 16 and increasing the taper of the inside surface of nozzle tip 23.

Also located within shut off valve 15 is an adjustable fluid pin 10 within bore 17 which is adjustable by cylinder actuator 11. Fluid pin 10 extends along the longitudinal axis of bore 17 and shut off valve 15 and terminates at piston rod 13 within pin actuator cylinder 11.

Piston rod 13 has a tapered slot 22 in contact with fluid pin 10 so that movement of piston rod 13 by actuator cylinder 11 moves fluid pin 10. It can be seen that fluid pin 10 may be positioned in a finite number of positions by movement of piston 12 attached to piston rod 13.

The dual fluid circuit for injecting pressurized gas, fluid vapor or liquid into the molten thermoplastic is shown in FIG. 1. The fluid enters nozzle assembly A at inlet 21 by way of fluid line 26 which may be supplied either a gas fluid vapor or liquid by the following fluid circuit.

A dry filtered air supply enters line 34, check valve 37 and air booster 36 where the pressure may be increased up to 2,500 lbs per square inch and stored in storage tank 35 after passing through check valve 38. Pressure switch 42 and gage 41 determines the air pressure in storage tank 35.

When it is desired to inject a pressurized fluid which is air into fluid inlet 21, on-off valve 44 is actuated to the on position and three way valve 46 is actuated to permit air to pass through line 45 to line 26 and inlet 21. The air pressure in line 26 is controlled by pressure reducing valve 43.

Another non viscous fluid which may be injected in inlet 21 is carbon dioxide also indicated as ($CO_2$) which is placed in accumulator 27. The top of accumulator 27 will contain $CO_2$ vapor shown at 57 and the bottom liquid $CO_2$ shown at 56. The pressure maintained in accumulator 27 is 300 to 500 lbs. per square inch depending on the pressure set by valve 47 which may be a spool or ball valve, venting fluid in the fluid condenser 55 which incorporates a liquid float valve and condensate pump. The same or more pressure acts in circuit containing liquid pump 30, air operated solenoid on-off valve 28, and check valves 29, 25, and liquid line 32, depending whether the fluid condenser 55 liquid float valve or condensate pump is used.

The venting circuit for fluid mixture is through three way valve 46, line 48 and three way valve 47, which may vent to atmosphere or direct the fluid to fluid condenser 55. Condenser 55 liquid float valve or condensate pump permits the passage of condensed liquid to accumulator 27 through line 49 and check valve 50. To remove the remaining fluid mixture, which is mainly air, condenser 55 is vented to atmosphere.

If it is desired to supply $CO_2$ vapor 57 to inlet 21, on-off valve 52 is actuated to permit $CO_2$ vapor 57 to pass through line 51, check valve 53, and open valve 46 to fluid line 26 and fluid inlet 21.

In reference to FIG. 1, when it is desired to flow plastic 63 into mold body B, a hydraulic screw ram of the screw ram assembly C is actuated thereby pressurizing a type of thermoplastic material which is caused to flow through the main body of nozzle assembly A and into the longitudinal bore 20a of the nozzle assembly front coupling tip 23.

The shut-off pin 15 (FIG. 1 and 3) is then moved rearward as shown. When this occurs, the bore 20a is opened at line seal surface 16a and thermoplastic material 63 is allowed to flow into sprue 20 of the mold body B. The molten plastic material 63 then flows into runner 58 between a pair of mold halves 59 and 60.

To keep the plastic material in a molten state as it flows through the nozzle assembly, electric heater elements 61 may be affixed around the outer periphery as illustrated in FIG. 1 or internally through cartridge rods (not shown).

After the molten plastic has begun to flow into sprue 20, a pressurized first fluid, which is carbon dioxide vapor is introduced at inlet 21 and enters fluid bore 17 in shut off valve fluid pin housing 15. The carbon dioxide vapor passes around adjustable pin 10 and past conic section pin tip 24 orifice to create a hollow fluid passage in sprue 20 and runner 58 in the molten plastic material 63 flowing into mold cavity 62. The carbon dioxide vapor is supplied to inlet port 21 by actuating valve 52 and 46 permitting gas to pass from vapor supply line 51 to line 26 where first fluid vapor enters inlet 21.

The first fluid, carbon dioxide vapor, injection is shut off by closing valve or pressure switch 52. Fluid injection at inlet 21 of a second fluid, which is air, is started by opening valve 44 and 46. The second fluid, air, passes from storage tank 35, through air lines 40, 45, to line 26 by way of open valves 44 and 46. The air then passes through the same passage the first fluid, carbon dioxide vapor, passed going into the hollow passage in the molten thermoplastic in sprue and runner and into the hollow cavity in mold cavity 62.

When mold halves 59 and 60 receive the predetermined quantity of thermoplastic material, the shut-off valve body 15 is moved forward making contact with nozzle 23 at line seal 16a due to the outside taper on valve body 15 and inside taper on nozzle tip 23, to terminate the flow of plastic material.

The injection of air is terminated, and pressurized liquid carbon dioxide ($CO_2$) is pumped into fluid inlet 21 from accumulator 27 through liquid line 33, and then through the same passage that air had passed into the hollow cavity in the thermoplastic material.

The pressurized liquid ($CO_2$) continues to flow through bore 17, around fluid pin 10, and over pin tip 24 orifice to enter hollow passage in sprue and runner and into the hollow cavity in the plastic in the mold cavity 62. As the carbon dioxide liquid enters the hollow cavity, it will start to evaporate into a vapor which will increase the fluid pressure and further pack the thermoplastic material in the mold cavity to conform to the mold cavity shape.

The thermoplastic in the mold cavity will also be cooled by the liquid $CO_2$ evaporation which shortens the time for cooling the thermoplastic to maintain its shape and permit earlier venting of the hollow cavity.

The injection of liquid $CO_2$ is terminated at a predetermined pressure by pressure switch 65 which stops liquid pump 30.

After the mold has cooled to permit the thermoplastic to set and maintain its shape, the pressurized fluid mixture in the hollow cavity can be vented back after adjusting the opening of fluid pin 10, and opening valve 46 to the venting line 48.

The preferred embodiment of the process for injection and exhaust of the non viscous fluids into the mold cavity 62 consists of the following:

A first fluid vapor 57 from accumulator 27, at a pressure of 300 lbs. per square inch, enters line 51 and passes through on/off valve 52, check valve 53, three-way ball valve 46, the line 26 and fluid inlet 21. The fluid vapor 57 enters fluid bore 17, within shut-off valve member body 15. The fluid bore 17 has an adjustable orifice at pin tip 24 controlled by fluid pin 10 having a conic shaped pin tip 24 and pin 10 adjustable in and out by pin actuator cylinder 11.

With the fluid pin 10 in the open position, vapor 57 enters the sprue 20 after thermoplastic material 63 has been allowed to flow into the mold body B. The entering of the pressurized vapor 57 into sprue 20 creates a hollow passage in the thermoplastic 63 due to the conic contour of fluid pin tip 24. The hollow passage continues through the thermoplastic into the runner 58 and to hollow cavity in thermoplastic in mold cavity 62 pushing thermoplastic against the mold cavity walls. The vapor injection is terminated by closing valve 52.

A second fluid, which is air, is supplied from storage tank 35 at a pressure of up to 2,500 lbs per square inch set by pressure reducing valve 43. The second fluid, air, passes through the same passage as the first fluid vapor, into the hollow cavity for packing.

To further pack the thermoplastic and improve the molding process, first fluid 56, in liquid phase, is pumped into inlet 21 from accumulator 27. Valve 28 and fluid pin 10 are placed in the open position. The liquid is pumped from accumulator 27 by pump 30 through check valve 29, on/off valve 28, line 32, and check valve 25. The liquid passes through pump 30 into line 33, which has pressure gage 64, pressure switch 65, and check valve 31, prior to entering line 26 and inlet 21.

The liquid 56 enters bore 17, open pin 10, and passes out conic pin tip 24 orifice into passage in sprue and runner and hollow cavity. The injection liquid, which may be either carbon dioxide, freon or nitrogen, does compress and pushes the vapor-air mixture into hollow cavity in mold cavity 62 increasing the packing of the thermoplastic material. Pressure switch 65 stops pump 30 at set pressure.

Once the liquid 56 enters the hollow passage in sprue 20, it will start to evaporate and increase the pressure within the hollow cavity and cool the hollow cavity surfaces. The pressure rise due to evaporation of liquid increases the packing of the thermoplastic and the cooling due to it will shorten the time necessary for the thermoplastic to set up.

When the thermoplastic has set, pin 10 is adjusted to vent at desired flow rate, both the liquid and gas through bore 17, outlet 21, into line 26, ball valve 46, line 48 and three-way ball valve 47.

Ball valve 47 will permit the vented fluid to either be vented to atmosphere or pass into fluid condenser 55, which has a liquid float valve or a condensate pump to permit condensed liquid to pass into line 49, check valve 50, to the top of accumulator 27. The fluid condenser 55 also has an electric operated relief valve to remove the remaining air vapor mixture by venting to atmosphere.

Venting of the fluid into fluid condenser 55 will save seventy to eighty percent of the fluid injected. When the fluid pressure in the hollow cavity is reduced to a predetermined value, it may be vented to atmosphere by actuating ball valve 47 to save cycle time. The predetermined value of pressure controls the initial temperature of evaporation of the first fluid in the cavity due to the presence of the first fluid vapor at its partial pressure in the fluid mixture. The molded part is then removed from mold cavity 62.

A second embodiment of the fluid circuit is the injection of air at a pressure of 100 lbs. per square inch, followed by carbon dioxide vapor at 300 lbs. per square inch, further followed by liquid carbon dioxide.

A third embodiment is the injection of carbon dioxide gas, freon gas, or nitrogen gas followed by injection of high pressure air around 2,500 lbs. per square inch for final packing of the molten thermoplastic When no liquid is used as a fluid, the liquid portion of the circuit may be eliminated and venting of the gas-air fluid will be to atmosphere by way of valve 47.

The thermoplastic that is injected through the nozzle assembly may be polypropylene, polystyrene, ABS or any suitable plastic including thermoset plastic.

The article produced in the mold cavity can be components in forming automotive products such as consoles and consumer products such as cabinets as well as many other items.

I claim:

1. A method for dual fluid injection molding thermoplastic or thermoset material comprising:
   providing a nozzle body through which molten thermoplastic or thermosetting material flows with a valve member having a bore through which fluid flows;
   providing within the valve member bore an adjustable fluid pin to establish an orifice through which fluids flow;
   communicating the nozzle body with a mold space into which the material flows;
   actuating the valve member to allow the material to flow through the nozzle body into the mold space;
   maintaining the adjustable fluid pin in a closed position to prevent the material from entering the fluid orifice and bore;
   subsequently opening the fluid pin allowing a first pressurized fluid in vapor phase flow through the valve member bore and fluid orifice into the thermoplastic or thermosetting material to form a hollow cavity in the material;
   subsequently allowing a second pressurized fluid of a different chemical composition than the first fluid to flow through the valve member bore and fluid orifice into the hollow cavity;
   actuating the valve member to terminate the flow of the thermoplastic or thermosetting material in the nozzle body;
   subsequently pumping the first fluid in a liquid phase at a pressure higher than the hollow cavity pressure to flow through the valve member bore and fluid orifice into the hollow cavity where it will start to evaporate at the partial pressure of the first pressurized fluid in vapor phase and thereby form a mixture of pressurized fluids;
   continuing to allow the first fluid liquid to evaporate and convert to a vapor fluid which will continue packing of the thermoplastic or thermosetting material to conform to the mold space;
   cooling the thermoplastic material or curing the thermosetting material to form a thermoset material;
   subsequently venting the mixture of pressurized fluids from the hollow cavity in the thermoplastic or thermoset material through the fluid orifice and valve member bore.

2. The method of claim 1 further comprising the step of having a ball valve direct the venting fluid into a fluid condenser and condensing the vented fluid into the liquid phase until the cavity pressure has dropped a predetermined value and then having the ball valve direct the venting fluid to atmosphere.

3. The method of claim 2 further comprising the step of returning the liquid from the fluid condenser to an accumulator providing recovery of the first fluid liquid for reuse in a subsequent cycle.

4. The process of claim 1 wherein the terminating of the flow of thermoplastic or thermosetting material is accomplished after a predetermined quantity has entered the mold space.

5. The process of claim 1 wherein the first fluid is carbon dioxide in vapor and liquid phase.

6. The process of claim 1 wherein the first fluid is Freon in vapor and liquid phase.

7. The process of claim 1 wherein the first fluid is nitrogen in vapor and liquid phase.

8. The process of claim 1 wherein said fluid pin shape and movement provides the fluid flow control in fluid supply and venting.

9. The process of claim 1 wherein the adjustable fluid pin is actuated to the closed position when the hollow cavity pressure reaches atmospheric and a small quantity of thermoplastic is reinjected to seal the opening formed by the fluids.

10. The process of claim 1 wherein the first fluid is carbon dioxide and the second fluid is air.

11. The process of claim 2 wherein the predetermined value of pressure controls the initial temperature of evaporation of the first fluid liquid in the cavity due to the presence of the first fluid vapor at its partial pressure in the fluid mixture.

12. The process of claim 1 wherein the first fluid liquid is prevented from evaporation in the valve member bore by providing insulation.

13. The process of claim 1 wherein the first fluid is selected from the group consisting of carbon dioxide, nitrogen and Freon and the second fluid is selected from the group consisting of air, carbon dioxide, nitrogen or Freon but is selected to be different than the first composition.

14. The method of claim 3 further comprising the step of maintaining the pressure in the accumulator higher than in the condenser by a condensate pump.

15. The method of claim 3 further comprising the step of controlling the first fluid vapor pressure in the accumulator by a pressure switch.

16. A method for molding thermoplastic or thermoset material comprising:
providing a nozzle body through which molten thermoplastic or thermosetting material flows with a valve member having a bore through which fluid flows;
providing within the valve member bore an adjustable fluid pin to establish an orifice through which fluid flows;
communicating the nozzle body with a mold space into which the molten thermoplastic or thermosetting material flows;
actuating the valve member to allow the molten thermoplastic or thermosetting material to flow through the nozzle body into the mold space;
maintaining the adjustable fluid pin in a closed position to prevent molten thermoplastic or thermosetting material from entering the fluid orifice and bore;
subsequently opening the fluid pin and adjusting said pin to allow a first pressurized fluid selected from the group consisting of carbon dioxide, nitrogen, and Freon to flow through the valve member bore and fluid orifice into the thermoplastic or thermosetting material to form a hollow cavity in said material;
subsequently allowing air in gas phase to flow through the valve member bore and fluid orifice into the hollow cavity wherein the air mixes with the first pressurized fluid;
actuating the valve member to terminate the flow of thermoplastic or thermosetting material in the nozzle body;
cooling the thermoplastic material or curing the thermosetting material until the material has set;
subsequently venting the mixture of pressurized fluids from the hollow cavity in the thermoplastic or thermoset material through the fluid orifice and valve member bore.

17. A method for dual phase fluid injection molding thermoplastic or thermoset material comprising:
providing an nozzle body through which molten thermoplastic or thermosetting material flows with a valve member having a bore through which fluid flows;
providing within the valve member bore an adjustable fluid pin to establish an orifice through which fluids flow;
communicating the nozzle body with a mold space into which the material flows;
actuating the valve member to allow the material to flow through the nozzle body into the mold space;
maintaining the adjustable fluid pin in a closed position to prevent the material from entering the fluid orifice and bore;
subsequently opening the fluid pin allowing a first vapor phase fluid at a pressure of 300 psi to 500 psi to flow through the valve member bore and fluid orifice into the thermoplastic or thermosetting material to form a hollow cavity in the material;
actuating the valve member to terminate the flow of the thermoplastic or thermosetting material in the nozzle body;
terminating the flow of said first vapor phase fluid after the vapor phase pressure in said cavity reaches saturation pressure;
subsequently pumping the first fluid in a liquid phase at a pressure higher than the hollow cavity pressure to flow through the valve member bore and fluid orifice into the hollow cavity where it will start to evaporate at the vapor pressure of the first pressurized fluid;
continuing to allow the fluid liquid to evaporate and convert to a vapor fluid which will continue packing of the thermoplastic or thermosetting material to conform to the mold space;
cooling the thermoplastic material or curing the thermosetting material to form a thermoset material;
subsequently venting the mixture of pressurized fluid from the hollow cavity in the thermoplastic or thermoset material through the fluid orifice and valve member bore.

* * * * *